United States Patent [19]
Rudd

[11] 3,794,805
[45] Feb. 26, 1974

[54] MAGNETIC PULSE WELDING USING SPACED PROXIMITY CONDUCTOR

[76] Inventor: Wallace C. Rudd, 8 Hidden Green Ln., Larchmont, N.Y. 10538

[22] Filed: July 2, 1971

[21] Appl. No.: 159,277

[52] U.S. Cl.............. 219/152, 29/470.1, 29/491, 29/497.5, 72/56, 214/9.5
[51] Int. Cl............................................. B23k 19/00
[58] Field of Search. 72/56; 219/9.5, 148, 151, 152, 219/154, 7.5, 8.5, 9.5; 228/3, 4; 29/470.1, 491, 493, 497.5, 421 M

[56] References Cited
UNITED STATES PATENTS

| | | | |
|---|---|---|---|
| 3,171,014 | 2/1965 | Ducati | 219/149 |
| 3,175,383 | 3/1965 | Levine | 29/421 M X |
| 3,187,532 | 6/1965 | Furth | 72/56 |

*Primary Examiner*—J. V. Truhe
*Assistant Examiner*—George A. Montanye
*Attorney, Agent, or Firm*—Brooks Haidt & Haffner

[57] ABSTRACT

Method and apparatus for performing a work function such as forming, welding, forging, or cutting on one or more electrically conductive workpieces. Work force is a pulse of magnetic pressure produced about a proximity conductor which is positioned closely adjacent the portion of the workpiece to be worked on and which is in conductive electrical connection with said portion of the workpiece.

21 Claims, 25 Drawing Figures

PATENTED FEB 26 1974 3,794,805
SHEET 1 OF 6
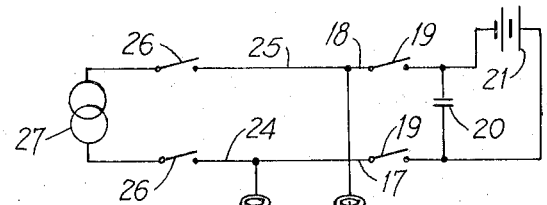
FIG. 1
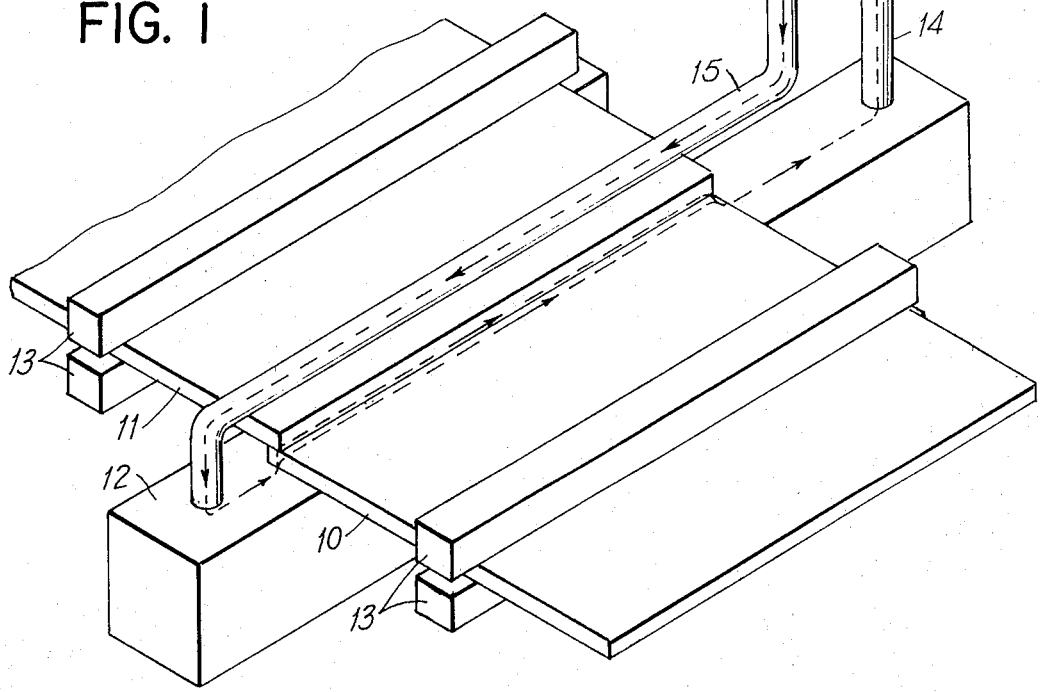
FIG. 2
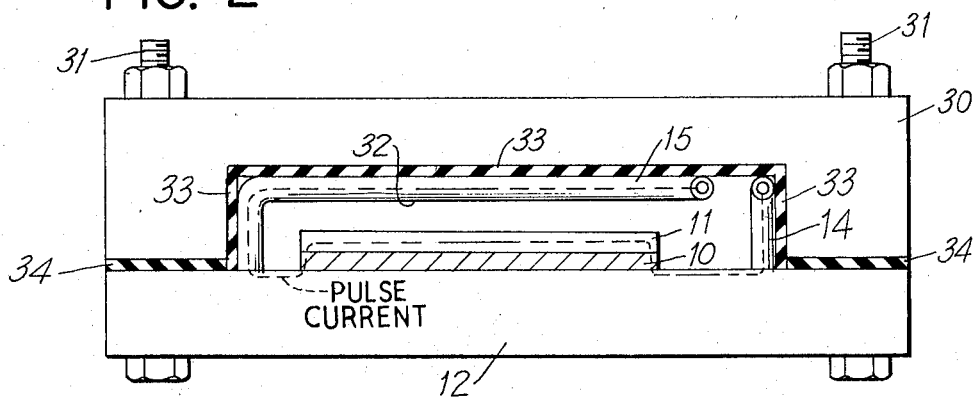
INVENTOR.
WALLACE C. RUDD
BY
John H. Gallagher
ATTORNEY

INVENTOR.
WALLACE C. RUDD

BY

John N. Gallagher
ATTORNEY

INVENTOR.
WALLACE C. RUDD
BY
John H. Gallagher
ATTORNEY

PATENTED FEB 26 1974 3,794,805

*INVENTOR.*
WALLACE C. RUDD

*BY*
John H. Gallagher
ATTORNEY

*INVENTOR.*
WALLACE C. RUDD
BY
*John H. Gallagher*
ATTORNEY

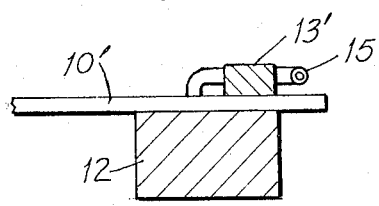
FIG. 22
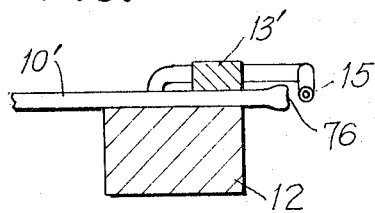
FIG. 24
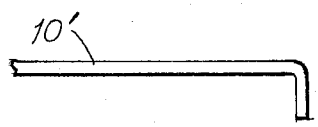
FIG. 23
FIG. 25
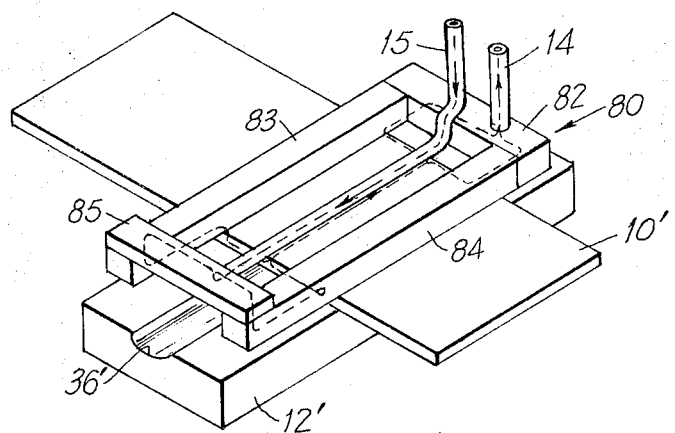
INVENTOR.
WALLACE C. RUDD
BY John H. Gallagher
ATTORNEY

MAGNETIC PULSE WELDING USING SPACED PROXIMITY CONDUCTOR

BACKGROUND OF THE INVENTION

In my copending application Ser. No. 938, filed Jan. 6, 1970, entitled "Welding by High Frequency Current Penetration," now U.S. Pat. No. 3,591,757 I disclose a method and apparatus for high frequency electrical resistance welding in which welding current is conducted through the portions of lapped workpieces to be welded in a continuous circuit which includes a proximity conductor that is positioned closely adjacent the portions of the workpieces to be heated to welding temperature. Current flows in the workpieces in the direction opposite to the direction of current flow in the proximity conductor. By making use of the proximity effect and the skin effect I am able to control the welding current so as to provide a useful welding method and apparatus. In that method of welding, some form of pressure must be applied to the workpieces to forge weld them after they have been heated. The pressure is applied by some type of hammer or moving anvil which physically strikes or somehow physically contacts the workpieces after they have been heated. Because the proximity conductor is positioned immediately adjacent the heated portions of the workpieces, it often must be moved out of the way or the workpieces must be moved before forging pressure can be applied. To accomplish either of these, relative complex mechanical and electrical apparatus must be provided. Often some time delay is experienced while mechanical operations are performed to apply forging pressure. This results in undesired heat loss in the workpieces.

It is known in the art to form and weld metal workpieces by a process which has come to be known as pulsed magnetic forming and welding. The manner in which this process is practied to form an identation in an electrically conductive tube, for example, is to place the tube within and electrically insulated from a solenoid and then pass a short duration, large magnitude current pulse through the solenoid. The pulse of current which flows in a first direction in the solenoid induces a pulse of current which flows in the opposite direction about the circumference of the portion of the tube that is within the solenoid. Magnetic fields associated with the currents interact with the currents to produce a force which acts radially inwardly about the circumference of the tube to reduce its diameter.

It also has been proposed to place a flat helical coil above and electrically insulated from the surface of a conductive sheet of metal which is in contact with a die or template. A pulse of current is passed through the flat coil and the accompanying pulse of magnetic pressure which acts on the surface of the conductive sheet forces the sheet onto the die to form the sheet in a desired shape.

Pipe ends may be lap welded by placing the ends in telescoping contact within an encirculing solenoid. A pulse of current passed through the solenoid produces a pulse of radially directed magnetic pressure which forces the pipe walls together to form a joint or a weld.

To improve the working conditions of the metal workpiece for forming, and to heat the workpieces for welding, it is known to first pass a continuous heating current through the solenoid or flat coil, then disconnect the heating current and immediately switch a current pulse to the solenoid or flat coil to produce the pulse of magnetic pressure which then forms, or welds, the workpieces which have been heated.

The above described processes of magnetic pulse forming and welding, have been used successfully, but because they require an encircling coil, which may be a single turn or multiple turns, or a flat helical coil, the physical geometry of the induction coils has restricted the use of the processes to a limited number of types of workpieces. In practice, the described processes have found little use except with tubular workpieces.

In further considering the deficiencies of the described magnetic pulse forming and welding processes it is recognized that inductive coupling of current to a workpiece inherently is less efficient than direct conductive connection of a current to a workpiece. Therefore, in the processes described, there is less current in the workpiece than in the primary circuit which includes the solenoid and its pulsed current source. This results in a pulsed magnetic pressure of lesser magnitude than would be produced if the same current that flows from the primary current source also were available in the workpiece.

In welding workpieces such as flat sheets or plates it usually is desired to heat only edge portions or narrow linearly extending regions of the workpieces, but because inductively coupled current must flow in the workpiece in a closed loop, the narrow linear regions of the workpieces to be heated will compromist but a portion of the closed loop. The result is that current flowing in the remainder of the loop gives rise to current losses, thereby reducing the efficiency of the system.

One proposal for magnetic pulse welding of two metal sheets or plates that are in lapped relationships is to place the lapped sheets between the two conductors of a hair pin shaped, or U-shaped, induction coil. A high frequency heating current is passed through the induction coil to resitivity, heat the lapped sheets, and then a short duration current pulse is passed through the coil to produce a pulse of magnetic pressure which forces the heated lapped edges together to form a weld joint. In this arrangement the induced current in the edges of the sheets flows in a closed loop which runs around the periphery of the lapped sheets, when looking at a transverse cross sectional view of the sheets at the lapped regions. That is, the current flows in one direction transversely across the top sheet, down along the sides of the two sheets, then transversely across the bottom sheet and then up the opposite sides of the sheets to the top sheet. The current flow across the top and bottom sheets is in opposite directions. The depth of penetration of the current into the top and bottom sheets is a function of several parameters which includes the frequency of the current, the magnetic properties of the metal, resitivity and the temperature of the metal. As the metal heats, the current will penetrate further into the interior of the sheets. When the sheets are thin, and particularly when they are at elevated temperatures, the depth of penetration of the current into the top and bottom sheets will be great enough that current flowing across the top sheet will tend to penetrate into the bottom sheet and vice versa. That is, at the contacting surfaces of the sheets, current will be attempting to flow in opposite directions. The result will be a cancellation of current at and adjacent the contacting surfaces. But, these are the regions that are to be heated to the highest temperatures in order to produce a good weld. Therefore, either a poor weld will be formed, or a long heating time will be required, and/or an excessively large power source will be required.

SUMMARY OF THE INVENTION

In the present invention I provide a method and apparatus for welding, and for forming and cutting, in which the described limitations of the prior art are overcome by the use of simple and efficient apparatus. I am able to eliminate both the undesirable consequences resulting from the use of mechanical means for applying pressure, and the undesirable consequences and limitations inherent in the known methods of magnetic pulse welding and forming.

In this invention both the source of heating current and the source of pulsed current which produces pulses of magnetic pressure are directly connected to the workpiece or workpieces by current conductors. One of the conductors is a proximity conductor which is disposed in closely spaced and electrically insulated relationship to the path of current flow in the workpiece or workpieces. With this arrangement, an efficient electrical system is provided and current flows only through the portions of the workpieces to be formed or welded. Because of the simple and direct connection of current pulses to the circuit which includes the workpiece and the closely adjacent proximity conductor, optimum magnetic pressure or force is produced by the pulse of current. The mechanical and electrical apparatus is adaptable for use with a variety of workpieces and permits a variety of different work functions to be performed. For example apparatus constructed and operated according to the teachings of this invention may be used for forming, forging, welding, and cutting.

BRIEF DESCRIPTION OF THE DRAWINGS

FIGS. 1 and 2 illustrate a method and apparatus for lap welding workpieces in accordance with the present invention;

FIGS. 21–23 illustrate a method and apparatus for bending an edge of a workpiece;

FIG. 24 illustrates means for upsetting an edge of a workpiece;

FIG. 25 is an illustration of an embodiment of the invention which is useful when employing an anvil which is a poor electrical conductor.

DESCRIPTION OF PREFERRED EMBODIMENTS

Figure 3:
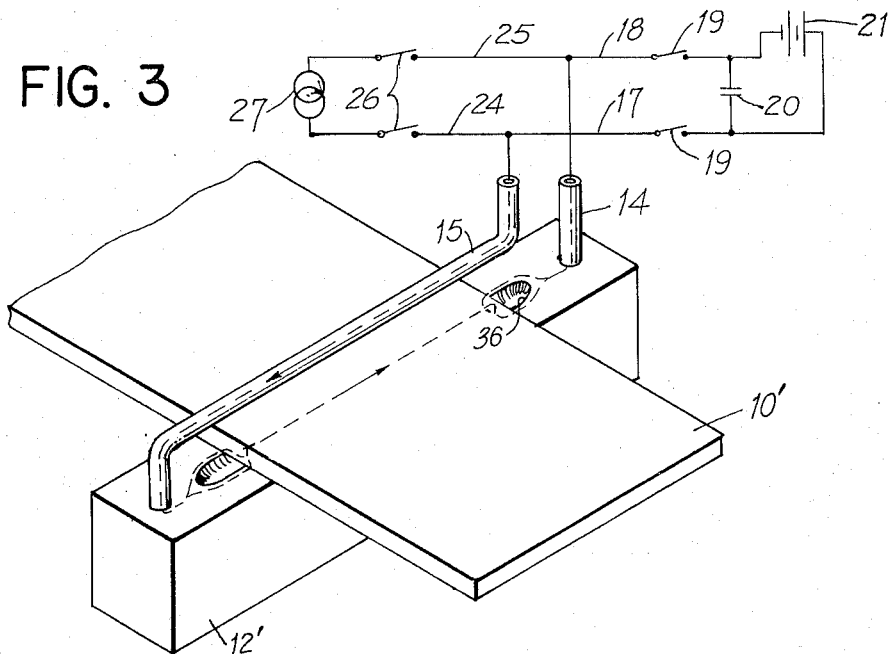
FIGS. 3–7 illustrate methods and apparatus for magnetic pulse forming in accordance with the teachings of this invention.

FIG. 1 is a simplified illustration of apparatus for the magnetic pulse welding of lapped edges of two electrically conductive metal sheets or plates 10 and 11. The end of bottom sheet 10 rests on an anvil or backing member 12 which is made of a conductive metal such as copper and which has good impact resistance without deforming. Sheets 10 and 11 are physically supported by bars 13. Any suitable supporting means may be used. Two electrical conductors 14 and 15 are in direct and continuous electrical contact with anvil 12 on opposite sides of sheets 10 and 11. Conductor 15 passes transversely across and is slightly spaced from the top of sheet 11. Conductor 15 is disposed directly above the overlapped portions of sheets 10 and 11 which are to be welded.

Conductors 14 and 15 are connected by means of leads 17 and 18 and switch 19 to a large storage capacitor 20. Capacitor 20 is connected to a source of d.c. charging current 21. Conductors 14 and 15 also are connected by leads 24 and 25, and by switch 26, to a source of high frequency welding current 27 which may have a frequency ranging from approximately 3 kilohertz to 450 kiloHertz, for example.

In the operation of the apparatus of FIG. 1 to weld the lapped ends of sheets 10 and 11, switch 19 first is opened and switch 26 is closed. Capacitor 20 will be charged by d.c. source 21. High frequency welding current will be coupled from high frequency source 27, through switch 26, through leads 24 and 25 to conductors 14 and 15. For an assumed direction of current flow, current will flow in a path through conductor 15 to anvil 12, then, due to skin effect and to the proximity effect produced by proximity conductor 15, current will flow up into and across a transverse path in both of the lapped portions of sheets 10 and 11 to the right side of anvil 12. The current then will flow through conductor 14, lead 25, through switch 26 back to source 27. As mentioned above, the combination of skin effect and proximity effect will cause the current to flow in the overlapped ends of sheets 10 and 11 directly under proximity conductor 15. The parameters of the electrical system may be so selected relative to the characteristics of the metal of sheets 10 and 11 that practically all of the heating current will flow in sheets 10 and 11 and very little in the portion of anvil 12 which supports sheet 10. For further explanation of the control of the depth of current penetration into workpieces, reference is made to my above-mentioned application.

After welding current has heated the overlapped portions of sheets 10 and 11 to their desired welding condition, which may be their plastic state, switch 26 is opened and switch 19 is closed. Suitable electronic and/or mechanical switching means may be employed for performing the required switching functions. Charged capacitor 20 now is directly connected to conductors 14 and 15 and the stored charge produces a large magnitude, short duration current pulse which flows to conductor 15, through the left portion of anvil 12, then preferably through only the overlapped portion of top sheet 11, through the right portion of anvil 12 to conductor 14 and back to capacitor 20.

The direction of current flow through proximity conductor 15 is opposite to the current flow through the sheet 11, and the high magnitude, short duration pulse produces a strong magnetic field around both of those portion of the current path. Therefore, the requisite conditions for magnetic pulse welding are present. The interaction between the current and magnetic fields causes a pulse of magnetic pressure to be exerted downwardly onto the heated overlapped portions of sheets 10 and 11 to force them together in a forging-type action to form the desired weld.

As mentioned above it is desired that the pulse of current flow through the overlapped portion of sheet 11 rather than through both sheets. The reason for this is that it is desired to have as much pressure as possible forcing sheet 11 onto sheet 10. Because a short duration current pulse having a sharply rising leading edge is rich in high frequency components, skin effect will cause the current pulse to flow near the surface of a conductor, and the proximity effect will cause it to flow in a path close to proximity conductor 15. Thus, with short pulses the current can be made to preferentially flow in sheet 11. This is not absolutely necessary to obtain satisfactory welds, but will produce optimum welds.

In addition to the force applied to the workpieces by the pulse of magnetic pressure, a reaction force also is applied to proximity conductor 15 which tends to move it away from the current path in the workpieces. A backing means therefore is required to maintain proximity conductor 15 in place. Such a structure is illustrated in FIG. 2 which shows the lapped sheets 10 and 11 supported on anvil 12, and the conductors 14 and 15 connected to anvil 12. A backing member 30 is secured to anvil 12 by means such as bolts 31 which extend through both members. Backing member 30 has a recessed portion 32 within which is located the proximity conductor 15. Electrical insulating material 33 insulates proximity conductor 15 from backing member 30. Electrical insulating material 34 also isolates anvil 12 from backing member 30. In order for the conductor 14 and 15 to clear the backing member 30, they will bend horizontally out of the recessed region 32. In the manner illustrated, backing support is provided for proximity conductor 15.

Because the current pulse which flows in the circuit must have a sharply rising leading edge, the backing member for proximity conductor 15 should not inductively load the electrical circuit. Preferably it is made of nonmagnetic material.

Support also must be provided for anvil 12. Any suitable type of supporting structure may be employed.

Although it often is desirable to first heat the portion of the workpieces to their plastic state before the pulse of magnetic pressure is applied, it may be desirable to eliminate the heating and simply forge weld the workpieces by applying only the magnetic pulse. One or a succession of pulses may be applied to the workpieces to forge weld them. Of course, a current pulse itself will generate some heat in the workpieces. If this cold forging mode of operation is to be followed, it is understood that high frequency source 27, switch 26, and leads 24 and 25 of FIG. 1 would not be required.

From the above description it is seen that sheets 10 and 12 have been forge welded in a simple and fast operation without the need for complex apparatus which otherwise would be required to provide a mechanical hammer or other type of physical tool to forge weld the overlapped sheets. Furthermore, the forging pressure is applied at the same location where the sheets are heated so that there is no heat loss experienced as would be the case if the sheets had to be moved to a different position to receive a physical hammer blow.

FIG. 3 is a simplified illustration of an embodiment of the invention useful for forming a sheet of metal by imparting a transversely extending depression or corrugation into the sheet 10'. Conductor 14 and proximity conductor 15 are connected to high frequency current source 27 and to capacitor 20 in the same manner as illustrated in FIG. 1. Conductors 14 and 15 are conductively connectively to opposite ends of anvil 12' which has an elongated recessed die 36 in its top surface. Sheet 10' is in conductive contact with the flat portion of the top surface of anvil 12'.

Figure 4:
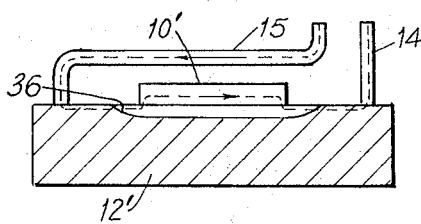
Figure 5:
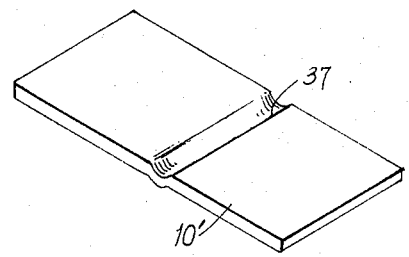

In operation of the embodiment of FIG. 3, assuming that it is desired to first heat the portion of sheet 10' that is to be formed, high frequency source 27 is connected to conductors 14 and 15 by closing switch 26. Switch 19 is opened to permit capacitor 20 to be charged by d. c. source 21. The path of heating current through conductors 14 and 15, anvil 12' and metal sheet 10' is illustrated in FIG. 4. As described above, the combination of the skin effect and proximity effect causes the current to flow up into and across sheet 10' to heat a narrow transverse strip of the sheet to a desired temperature for forming. Switch 26 then is opened and switch 19 is closed to connect the now charged capacitor 20 to conductors 14 and 15. A short duration, large magnitude current pulse then flows in the circuit illustrated in FIG. 4. The interaction of the current pulse flowing in proximity conductor 15 and in sheet 10' with their associated magnetic fields produces the pulse of magnetic pressure which acts on sheet 10' and forces the heated portion into die 36 to impart a transverse corrugation 37 therein, as illustrated in FIG. 5. For clarity of illustration, backing supports for proximity conductor 15 and anvil 12' have not been shown in FIGS. 3 and 4. Previously described arrangements for this purpose may be used.

If the properties of the material of metal sheet 10' of FIGS. 3 and 4 so permit, it may be desirable to eliminate the preheating of the transverse strip of sheet 10' and directly from the corrugation 37 by the application of only the pulsed current from charged capacitor 20. One or a succession of pulses may be used.

Figure 6:
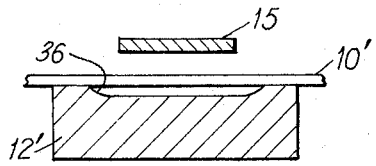

Differently shaped dies may be provided in anvil 12' of FIGS. 3 and 4. Several alternatives are shown in simplified form FIGS. 6 and 7. In FIG. 6, anvil 12' has a wide trough shaped die 36' extending straight across its top surface. Proximity conductor 15 also is broad and extends parallel to die 36' so that, due to the proximity effect, the path of current flow across metal sheet 10' will be substantially as broad as proximity conductor 15. Similarly, the magnetic forming force applied to sheet 10' by the application of a current pulse will be distributed over a width of sheet 10' substantially as broad as proximity conductor 15. The resultant deformation of sheet 10' will be a broad straight corrugation.

Figure 7:
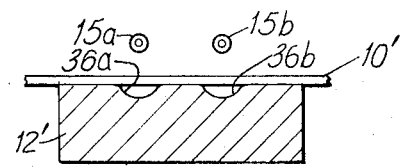

In FIG. 7, the die along the top surface of anvil 12' is comprised of two straight parallel slots or recesses 36a and 36b. The proximity conductor means is comprised of two straight parallel conductors 15a and 15b which may be electrically connected in parallel at least for a distance which is coincident with the die recesses 36a and 36b in the top surfaces of anvil 12'. Because of the twin proximity conductors 15a and 15b, current flow across sheet 10' will be in two narrow parallel paths directly under the respective proximity conductors. The magnetic force applied to sheet 10' resulting from the application of a current pulse will be localized at the two parallel regions under proximity conductors 15a and 15b and will force sheet 10' into die recesses 36a and 36b to form two parallel corrugations across the sheet.

The die in the top surface of anvil 12' need not be precisely straight nor precisely transverse relative to sheet 10'. The die may be curved, slanted, raised rather than recessed, discontinuous, or may contain angles and bends, or may comprise a pattern for ornamental or structural purposes. So long as the proximity conductor means is disposed over and is parallel to the die, a sheet or plate will take the shape of the die upon application of the current pulse from the storage capacitor. If different magnitudes of pressure are to be applied to different portions of the workpiece, or if the magnitude of deformation of the workpiece is to be nonuniform, the spacing of various portions of the proximity conductor from the workpiece may be different. The closer the proximity conductor is to the workpiece the greater will be the magnetic force applied to the workpiece. Therefore, nonuniform spacing of the proximity conductor from the workpiece will produce nonuniform magnetic pressure on the workpiece.

Figure 8:
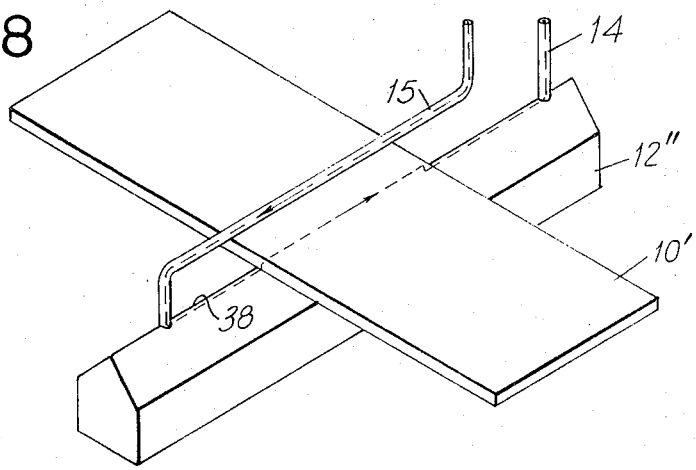
FIGS. 8–10 illustrate means for cutting or severing a workpiece in accordance with the teachings of this invention.

FIG. 8 illustrates another operation that may be performed on a sheet or plate 10' of electrically conductive material in accordance with the principles of this invention. Electrically conductive anvil 12'' is provided with a hardened knife edge 38 at least along the portion thereof which is in continuous contact with sheet 10'. As in the previous embodiments, conductors 14 and 15 are in direct electrical contact with the anvil, and proximity conductor 15 is aligned with and spaced above knife edge 38. Conductors 14 and 15 will be connectable to a source of current pulses, and if preheating of sheet 10' is desired, the conductors also will be connectable to a source of high frequency heating current, as illustrated in FIGS. 1 and 3. When a current pulse passes through the circuit that includes proximity conductor 15 and the narrow transverse strip of sheet 10' which lies immediately below the proximity conductor, the pulse of magnetic pressure generated will force sheet 10' into knife edge 38 partially to cut or fully sever the sheet, depending upon the magnitude of magnetic force applied to sheet 10'. Preheating of the narrow transverse strip of sheet 10' which is under proximity conductor 15 will permit the desired cut to be performed with a lesser magnitude current pulse in the circuit than if sheet 10' were cold when the pulse is applied.

Figure 9:
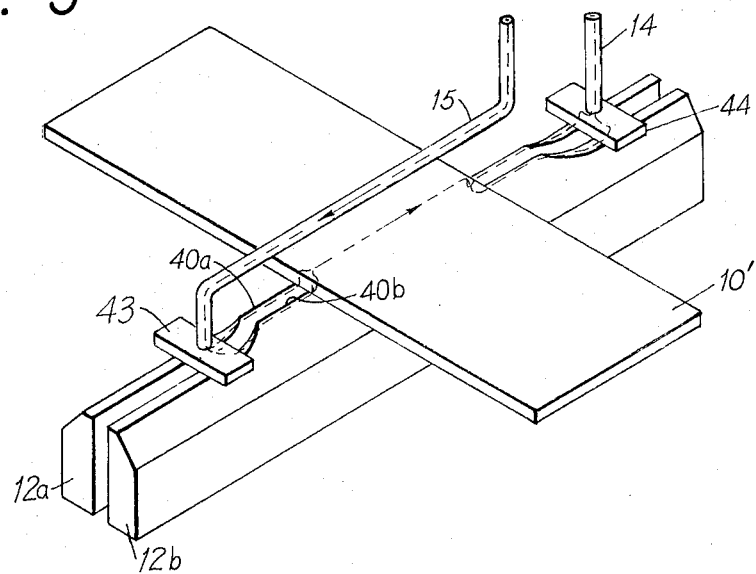
Figure 10:
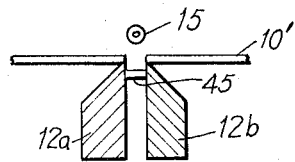

FIGS. 9 and 10 illustrate another embodiment of the invention in which a double cut or severence is made across electrically conductive sheet 10'. The electrically conductive anvil is comprised of two parts 12a and 12b which are spaced apart at least in the center region which is in contact with sheet 10'. Anvil members 12a and 12b are provied with hardened knife edges 40a and 40b and sheet 10' rests on these knife edges. The top end regions of anvil members 12a and 12b are flattened and electrical contacts 43 and 44 provide direct conductive contact of conductors 14 and 15, respectively, with the anvil members.

The path of current flow through the apparatus is illustrated in FIG. 9 by the broken lines. It is seen that between the respective electrical contacts 43 and 44 and sheet 10', the current flows in parallel paths along the edges of anvil members 12a and 12b. Proximity effect and skin effect will cause the current to flow across sheet 10' in a narrow transverse path directly under proximity conductor 15.

Conductors 14 and 15 may be connected to an electrical circuit such as illustrated in FIGS. 1 and 3 if preheating of strip 10' is desired, or only to the capacitor circuit if preheating is not to be used. Upon discharge of the charged capacitor, the short duration current pulse will flow through the circuit illustrated in FIG. 9 and the resultant pulse of magnetic pressure which acts downwardly on sheet 10' will force the sheet into knife edges 40a and 40b to cut a narrow strip 45, FIG. 10, from sheet 10'. As mentioned in connection with FIG. 8, the cut made by the knife edges 40a and 40b may not completely sever sheet 10' if it is so desired. Furthermore, the knife edges 40a and 40b may have shapes other than straight edges. As an example, the knife edges may be shaped so that the severed edges of sheet 10' include knotches or tabs.

Figure 11:
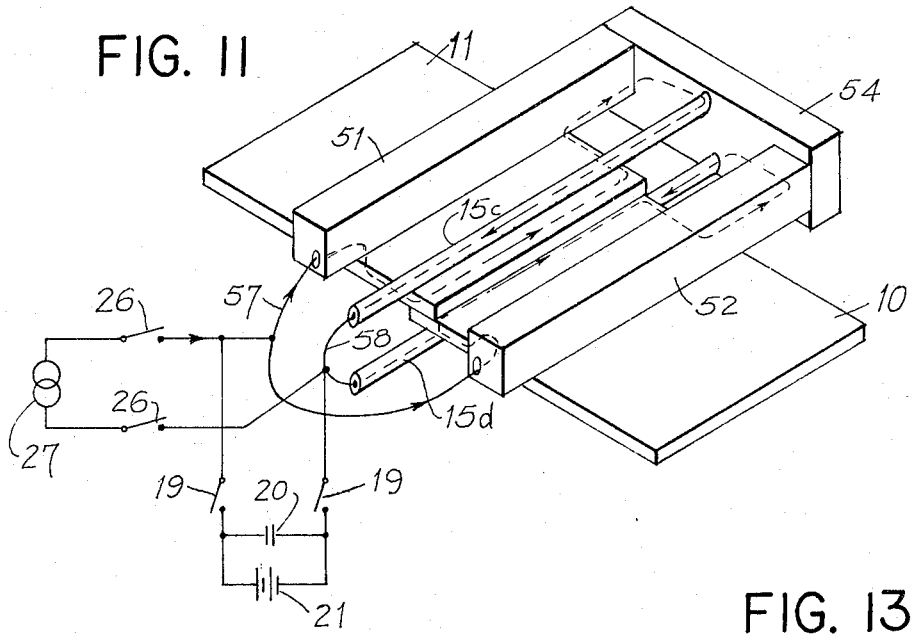
FIGS. 11–13 illustrate an alternative arrangement for welding workpieces by employing a pair of proximity conductors.

In all of the previously described embodiments of the invention the workpiece or workpieces which were subjected to the force of the magnetic pulse rested on a conductive anvil. FIG. 11 illustrates apparatus for lap welding two sheets, but instead of using an anvil 12 as in FIG. 1, a reaction force is provided by the use of a second proximity conductor which is positioned on the side of the workpieces opposite from the first proximity conductor. Electrically conductive metal sheets 10 and 11 are in overlapping contact at their end regions, and electrically conductive bars 51 and 52 extend transversely across and are in electrical contact with sheets 11 and 10, respectively. An electrically conductive jumper bar 54 connects bars 51 and 52 at their right ends. Two proximity conductors 15c and 15d are in direct conductive contact with jumper bar 54 and extend transversely above and below the lapped ends of sheets 10 and 11.

Considering now the electrical connections to the apparatus of FIG. 11, the left ends of conductive bars 51 and 52 are connected in parallel by lead 57, and the left ends of proximity conductors 15c and 15d are connected in parallel by lead 58. High frequency heating current source 27 is connected through switch 26 to the respective parallel connector leads 57 and 58. Storage capacitor 21 is connected through switch 19 to the parallel connector leads 57 and 58.

With switch 26 closed and switch 19 open welding current will flow in the path indicated on the drawing by the broken lines. Current from the top terminal of high frequency source 27 will flow to parallel connector lead 57 where it divides equally and flows in parallel to the left ends of bars 51 and 52. Due to the proximity effect exhibited by the high frequency current, it will flow from the respective conductor bars 51 and 52 to and along the left side regions of sheets 10 and 11 to the overlapped portions of the sheets. Current then will flow transversely across the respective overlapped portions of the two sheets to the right sides of those sheets. The parallel branches of the current path then turn and follow the right sides of the sheets back to conductor bars 51 and 52. The respective parallel branches of the current path continue to the right ends of bars 51 and 52 and cross over to the center region of jumper bar 54. The current path continues from right to left in parallel branches through proximity conductors 15c and 15d and then to parallel connector lead 58, through the bottom portion of switch 26 to source 27. After the welding current has heated the overlapped ends of sheets 10 and 11 to welding temperature, switch 26 is opened and switch 19 is closed.

Because capacitor 20 also is connected, through switch 19, to the parallel connector leads 57 and 58, a pulse of current which flows from capacitor 20 when switch 19 is closed will follow the same paths as just described and as illustrated in FIG. 11. It may be seen that the direction of current flow in the top proximity conductor 15c is opposite to the direction of current flow across the overlapped end of top sheet 11, and similarly, the direction of current flow in the bottom proximity conductor 15d is opposite to the direction of current flow across the overlapped end of bottom sheet 10. Therefore, the requisite conditions are present for the generation of two simultaneously occurring pulses of magnetic pressure which act, respectively, downwardly on the top surface of sheet 11 and upwardly against the bottom surface of sheet 10. The overlapped ends of sheets 10 and 11 therefore experience forging pressures from the top and from the bottom and no anvil is required.

The magnetic pressures exerted against the top and bottom surfaces of overlapped sheets 10 and 11 should be substantially equal so that there is no up or down displacement of the sheets when the pulses of magnetic pressure act upon them. This requires that the parallel branches of the current path have substantially identical electrical characteristics so that equal currents will flow through proximity conductors 15c and 15d and through overlapped edges of sheets 10 and 11. It is to be understood that suitable backing means are to be provided for proximity conductors 15c and 15d.

In the embodiment of FIG. 11, conductor bars 51 and 52 also may serve as physical support for sheet 10 and 11. Other support means will be located below bars 51 and 52, but have been omitted from the drawing in order to simplify the presentation of the inventive aspects.

Although the overlapping ends of sheets 10 and 11 are illustrated in FIG. 11 as being in contacting relationship, they may be slightly spaced in a vertical direction if desired. The electrical circuits will be precisely the same as described in connection with FIG. 11 and the spaced, overlapped ends will be forced together to form a lap weld upon application of the current pulse from capacitor 20.

Figure 13:
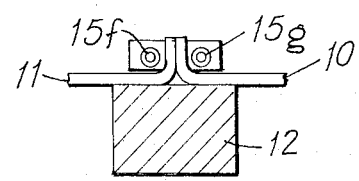
Figure 12:
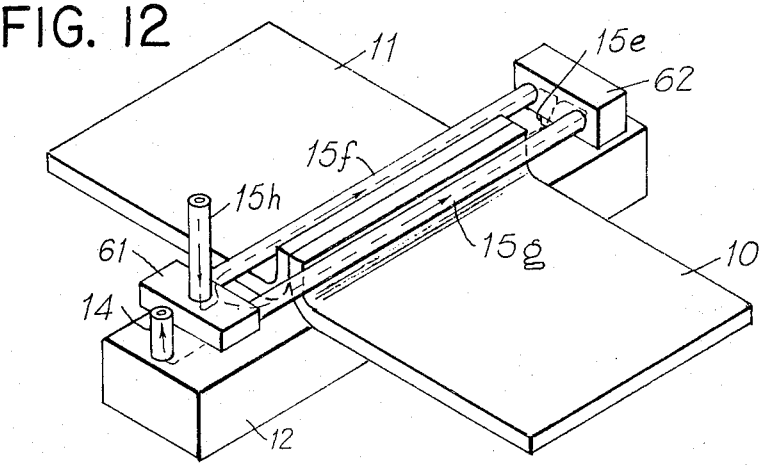

Twin proximity conductors for providing pulses of magnetic pressure to workpieces may be used in an arrangement illustrated in FIGS. 12 and 13 to produce a lip weld between the upturned ends of sheets 10 and 11. Sheets 10 and 11 are supported by suitable means, not illustrated, in conductive contact with anvil 12. Conductor 14 also is in conductive contact with anvil 12 as is short conductor 15e of the proximity conductor means. Conductors 15f and 15g are electrically connected in parallel by connector blocks 61 and 62 and are disposed on opposite sides of the upturned ends of sheets 10 and 11. Conductors 14 and 15h are to be connected to a high frequency current source and to a source of pulsed current such as illustrated in FIGS. 1 and 3.

The current path in the structure of FIG. 12 will be from conductor 14 to anvil 12, then along the anvil to the sheets 10 and 11. Due to skin effect and proximity effect, the current will flow across the upturned contacting lips of sheets 10 and 11 at narrow transverse regions adjacent proximity conductors 15f and 15g. At the right edges of sheets 10 and 11 the current will return to anvil 12 and then will flow through short conductor 15e into connector block 62. The current then will divide into parallel paths and will flow through proximity conductors 15f and 15g to connector block 61, through conductor 15h, and back to its source.

If the upturned edges of sheets 10 and 11 are to be first heated, a high frequency current source will be connected to conductors 14 and 15h, and then the source of pulsed current will be connected to those conductors. The pulses of magnetic pressure produced by the pulsed current flowing through proximity conductors 15f and 15g, and through the upturned edges, will generate magnetic pulse forging pressure acting inwardly against the upturned portion of each sheet to forge weld the ends of the sheets.

Figure 14:
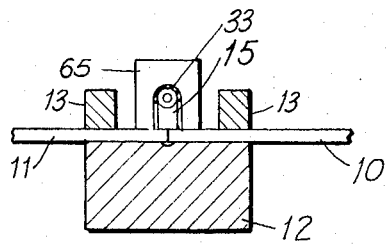
FIGS. 14–17 illustrate the butt welding of metal plates by employing the principles of this invention.

Butt welds also may be made in accordance with the teachings of this invention. FIG. 14 is a cross sectional view of apparatus somewhat similar to FIG. 1 except that metal plates 10 and 11 are in butting contact and anvil 12 has a recess under the butting edges of the plates, although this recess is not a necessity. Bars 13 support plates 10 and 11 on anvil 12 and a backing member 65, similar to member 30 of FIG. 2, provides support for proximity conductor 15 against the force of the magnetic pulse. The electrical connections to the apparatus will be as illustrated in FIG. 1.

Figure 15:
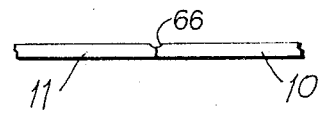

Heating current applied to the apparatus of FIG. 14 will flow in the butting edges of plates 10 and 11 immediately below proximity conductor 15. Upon termination of the heating current and upon application of the large magnitude current pulse, the accompanying pulse of magnetic pressure on the heating butting edges of plates 10 and 11 will impart a dent 66, FIG. 15, into the butting edges and forge weld them together.

Figure 16:
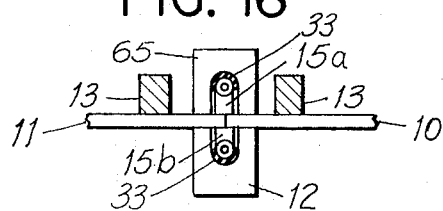
Figure 17:
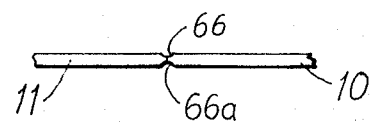

In FIG. 16, twin proximity conductors 15a and 15b, which are connected in parallel in accordance with the previous teachings of this invention, are disposed above and below the butted ends of plates 10 and 11. The forge welding operation will be as described with regard to FIG. 15 except that two dents 66 and 66a, FIG. 17 will be formed into the forge welded edges of plates 10 and 11.

Figure 18:
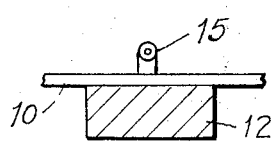
FIGS. 18–20 illustrate a method and apparatus for forming a depression either partially through or completely through a workpiece.
Figure 19:
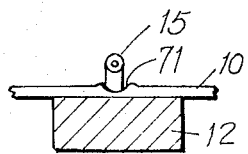
Figure 20:
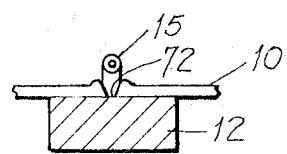

FIGS. 18–20 illustrate other work tasks that may be performed by employing the teachings of this invention. In FIG. 18, a workpiece 10 such as an electrically conductive plate is disposed on electrically conductive anvil 12, and proximity conductor 15 extends across plate 15 in closely spaced relationship thereto. The apparatus of FIG. 18 is substantially the same as illustrated in FIG. 1, but FIG. 18 has been simplified for the purpose of brevity. Assuming that a heating current first is connected to the electrical circuit that includes proximity conductor 15 and plate 10, a narrow strip of the plate 10 that is immediately under proximity conductor 15 is heated to a desired temperature. The heating current is terminated and a large magnitude current pulse then is coupled to the electrical circuit. The resulting pulse of magnetic pressure acts on the heated region of plate 10 and produces a transverse depression or necked down region 71, FIG. 19, in the top surface of plate 10. The extent to which the depression 71 is formed in plate 10 will be a function of the temperature of the heated portion of the plate, the magnitude and duration of the current pulse applied to the electrical conductors, and the spacing between proximity conductor 15 and plate 10.

FIG. 20 illustrates an embodiment of the invention similar to FIGS. 18 and 19 wherein plate 10 is completely severed as a result of the application of the current pulse to the electrical conductors. In this instance it may be desirable to heat the narrow region of plate 10 that is under proximity conductor 15 to a molten condition, at least partially through its thickness dimension.

As mentioned with regard to other embodiments of the invention, the proximity conductors of FIGS. 18–20 need not extend straight across the workpiece but may be curved to provide any of a variety of differently shaped depressions or cuts in the workpiece.

Figure 21:
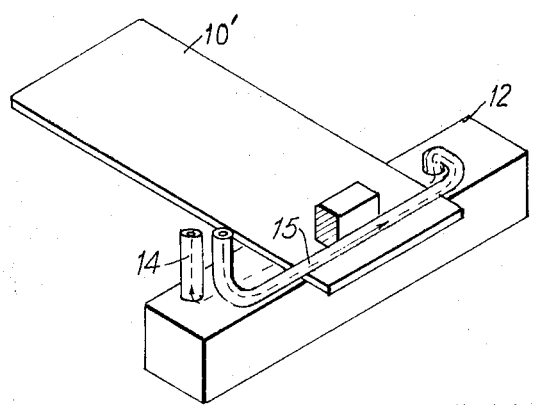

FIGS. 21–23 illustrate in simplified form means for bending over the edge of a strip of conductive workpiece 10'. The right edge of strip 10' extends beyond the top right edge of anvil 12 and proximity conductor 15 is shaped to be disposed directly over the overhanging edge of the strip. A suitable clamping means, illustrated only in FIG. 22, clamps strip 10' at the top right corner of anvil 12. A current pulse applied to conductors 14 and 15 will produce a pulse of magnetic pressure directed downwardly on the overhanging portion of strip 10' and form a bent edge strip as illustrated in FIG. 23.

As illustrated in FIG. 24, the edge of strip 10' may be upset rather than bent down by positioning proximity conductor 15 adjacent to and parallel the edge surface 76 of strip 10'.

In both of the embodiments of FIGS. 21 and 24, the portion of the workpiece to be formed may be preheated in the manner previously described if so desired.

In addition to the specific types of welds illustrated and described herein, various other types of welds may be formed in accordance with the present invention. Further examples may be seen by referring to my above-mentioned application Ser. No. 938, it being understood that by employing the teachings of the instant invention no mechanical hammer or moving anvil is required to provide forging pressure.

In the previously described embodiments that employed a fixed anvil, the conductors 14 and 15 were in conductive contact with the anvil. In some situations this may not be desirable. In FIG. 3, for example, the anvil 12' has a die 36 in its top surface and sheet 10' is forced into the die to form a corrugation. It may be desirable to make anvil 12' from a hard metal that will withstand repeated forming operations and which has poor electrical conductivity. Therefore, an arrangement such as illustrated in FIG. 25, is useful since current need not flow through the anvil 12'. The top ends of conductors 14 and 15 are connected to an electrical circuit such as illustrated in FIG. 3, and their opposite ends are connected to a metal framework 80 made of a good conductive material such as copper. Framework 80 extends across conductive sheet 10' and holds the sheet on the top surface of anvil 12'. A die 36' extends across the top surface of anvil 12' and serves to form a transverse corrugation in sheet 10' when a current pulse is applied to conductors 14 and 15.

Framework 80 is comprised of an end member 82 to which conductor 14 is conductively connected. Bars 83 and 84 extend transversely across sheet 10' and are joined at their left ends by end member 85. Only bars 83 and 84 are in contact with sheet 10'.

Current from a pulsed current source, and from a source of high frequency heating current, if preheating of sheet 10' is desired, flows through proximity conductor 15 and into end member 85. The current path then takes parallel branches to the left ends of bars 83 and 84. Due to proximity effect and skin effect, the current from the parallel branches in bars 83 and 84 then flows to a narrow transverse portion of sheet 10' which lies directly below proximity conductor 15. At the right side of sheet 10' the current path again follows parallel branches in the right ends of bars 83 and 84, passes through block 82 to conductor 14, and the returns to the source.

Upon application to conductors 14 and 15 of the large magnitude current pulse having a fast rising leading edge, the simultaneously occurring pulse of magnetic pressure acts against the portion of sheet 10' below proximity conductor 15 and forces it into die 36' to form a transverse corrugation therein. It is seen that anvil 12' is virtually excluded from the current path so that its electrical conductivity is of no importance.

In various ones of the drawings two electrically conductive sheets are illustrated as being worked upon, as by welding. In practice, the two illustrated members may be in fact the edge portions of a single member such as sheet of metal which has been formed into a tubular shape. The welding process described forms the weld that completes the tubular product which may be a can body or a pipe, as examples.

It is to be understood that the illustrated circuitry of the heating current source and the pulsed current source are but simplified representations. The sources of current, themselves, are not the subject of this invention. Any suitable circuitry may be utilized to supply the currents required in the practice of this invention.

What is claimed is:
1. A method of forge welding together a pair of electrically conductive workpieces at predetermined portions thereof comprising the steps,
placing one of said portions adjacent to the other of said portions,
establishing a continuous conductive electrical circuit that includes a first current path through at least one of said portions and a second current path through proximity conductor means disposed closely adjacent said one portion,
connecting a source of pulsed current to said circuit in a manner to cause a pulse of current to flow in a first direction in the first path through said one portion and to cause said current pulse to flow in an opposite direction in the second path through said proximity conductor means, and
while producing in said source of pulsed current one or more current pulses that have sufficient magnitude and sufficiently rapid rise time to produce about said proximity conductor means a magnetic field which interacts with a same current pulse then flowing in the first path to exert on said one portion a force urging said one portion toward said other portion and sufficient to forge weld said one portion to said other portion, opposing movement of said other portion away from said one portion.
2. The method claimed in claim 1 further comprising the step of causing current to flow through said con- ductive circuit in one direction in said first path and in the opposite direction in said second path prior to producing said pulses in said source of current.

3. The method claimed in claim 1 wherein said portions are edge portions of said workpieces and said portions are placed in butting contact, and wherein the step of connecting the source of current pulses to the circuit includes, establishing conductive electrical connection between one region where the workpieces are in butting contact and said source of current pulses, and establishing conductive electrical connection of the proximity conductor means between a second region where the workpieces are in butting contact and said source of current pulses.

4. The method claimed in claim 1 wherein said portions are placed in overlapped relationship thereby to form said first path, and wherein the step of connecting the source of current pulses to the circuit includes, establishing electrical connection between one overlapped region of the workpieces and said source of current pulses, establishing conductive electrical connection of the proximity conductor means between another overlapped region of the workpieces and said source of current pulses.

5. The method claimed in claim 1 and including the step of heating said portions of the one or more workpieces prior to connecting said source of pulsed current to the electrical circuit by passing a high frequency heating current through said electrical circuit.

6. The method claimed in claim 1 wherein the step of opposing movement of said other portion comprises supporting said workpieces on or adjacent a substantially nondeformable and substantially fixed member.

7. The method claimed in claim 6 wherein said portions are edge portions of sheet metal and wherein the step of supporting said workpieces on or adjacent a substantially nondeformable and substantially fixed member is comprised of placing said edge portions of electrically conductive material in overlapping relationship on a forging anvil with the remainder of the sheet metal in nonoverlapping relation, said overlapping edge portions being placed immediately adjacent, but in spaced relationship to, said proximity conductor means.

8. A method for forge welding together two portions of electrically conductive material comprising the steps of placing said two portions adjacent to but slightly spaced from proximity conductor means, establishing conductive electrical connection between said proximity conductor means and respective first regions on said two portions, connecting a source of current to said proximity conductor means and to respective second regions of said two portions to establish a circuit in which current will flow in one direction in a path between the first and second regions of the two portions and in an opposite direction through the closely adjacent proximity conductor means, and while generating in said source a current pulse that has a sufficiently rapid rise time and a sufficiently large magnitude to produce about said proximity conductor means a magnetic field which interacts with the same current pulse flowing through said path in the two portions to exert on one of said portions a force urging said one portion toward said other portion and sufficient to forge weld said one portion to the other of said portions, opposing movement of said other portion away from said one portion.

9. The method of claim 8 and including the further step of supplying an alternating heating current to said circuit prior to the generation of current pulses in said source, thereby to heat said portions prior to the application of said force.

10. A method of forge welding together two contacting portions of electrically conductive material comprising the steps establishing a first current path between first and second regions of said portions, establishing a second current path closely adjacent to said first path but spaced from said portions, establishing conductive electrical connection between one region of said first path and one region of said second path so that at a given time current flows in opposite directions in the two paths, connecting a source of current to respective second regions of the two paths, wherein the two regions of each path are at ends of the respective paths, and while generating in said source a pulse of current that has a sufficiently rapid rise time to produce about said second path a magnetic field which interacts with the same current pulse then flowing in the first path to exert on said portions a force urging said one portion toward said other portion and sufficient to forge weld one of said portions to the other of said portions, opposing movement of said other portion away from said one portion.

11. The method claimed in claim 10 including the further step of passing an alternating current through said two paths prior to connecting said source of current to the two paths.

12. Apparatus for forge welding together adjacent portions of a pair of workpieces by the application of a pulse of magnetic pressure thereto, comprising means providing a conductive electrical connection to a first region of said portions, means providing a conductive electrical connection to a second region of said portions for establishing in at least one of said portions a first current path between said two regions, means establishing a second current path closely adjacent and substantially parallel to the first current path but spaced from said portions, one end of the second current path being conductively connected to said second region in a manner to establish a conductive circuit in which, at a given time, current flows in opposite directions through said two paths, a current source for producing one or more current pulses that have sufficient magnitude and sufficiently rapid rise time to produce about the second current path a magnetic field which interacts with a same current pulse then flowing in the first path to exert on one of said portions a pulse of magnetic pressure urging said one portion toward said other portion and sufficient to forge weld one of said portions to the other of said portions, means for coupling said current source to the means providing said connection to the first region of said portions and to the other end of said second current path, and means for opposing movement of said other portion away from said one portion.

13. The apparatus claimed in claim 12 and further including, means selectively operable with said current source for causing an alternating heating current to flow in said first and second paths to heat at least said portions of said workpieces.

14. The apparatus claimed in claim 12 wherein said means for opposing movement of said other portion includes a substantially non-deformable member disposed relative to said other portion so that the pulse of magnetic pressure exerted on said one portion forces said portions against said nondeformable member.

15. The apparatus claimed in claim 14 wherein said nondeformable member includes a forging surface for forging said portions.

16. Apparatus claimed in claim 14 wherein said portions are disposed in contacting relationship between said two regions, at least one of the workpieces being supported on the nondeformable member.

17. Apparatus claimed in claim 16 and further including means for selectively applying an alternating heating current to said first and second paths to heat said portions of said workpieces to a desired working temperature.

18. Apparatus claimed in claim 12 wherein the means establishing the second current path is a first proximity conductor disposed adjacent said one portion and said means for opposing movement of said other portion comprises a second proximity conductor disposed adjacent said other portion and connected in parallel with said first proximity conductor, to thereby provide a pair of spaced proximity conductors forming two branches of the second current path, said portions being disposed between said spaced proximity conductors.

19. Apparatus for forge welding together adjacent portions of a pair of workpieces by the application of a pulse of magnetic pressure thereto, comprising means for establishing electrical conductive contact with respective ones of two spaced regions of one of said portions, a proximity conductor means disposed closely adjacent but spaced from said one portion, means establishing electrical conductive contact between one end of the proximity conductor means and the means for establishing contact with one of said spaced regions of said one portion, means for connecting a source of current pulses between the other end of the proximity conductor means and the means for establishing conductive contact with the other one of said regions of said one portion to establish a circuit in which current flows in opposite directions in said one portion and said proximity conductor, said source producing one or more current pulses that have sufficient magnitude and sufficiently rapid rise time to produce about the proximity conductor a magnetic field which interacts with a same current pulse then flowing in said one portion to exert a force on said one portion urging said one portion toward said other portion which is sufficient to forge weld said one portion to the other of said portions, and means for opposing movement of said other portion away from said one portion.

20. The apparatus claimed in claim 19 and further including means for selectively applying an alternating heating current to said circuit whereby said heating current flows in opposite directions in said one portion and in said proximity conductor.

21. Apparatus for welding together adjacent portions of a pair of workpieces by the application of a pulse of magnetic pressure thereto, comprising means providing a conductive electrical connection to a first region of said portions, means providing a conductive electrical connection to a second region of said portions for establishing in at least one of said portions a first current path between said two regions, means establishing a second current path closely adjacent and substantially parallel to the first current path but spaced from said portions, one end of the second current path being conductively connected to said second region in a manner to establish a conductive circuit in which, at a given time, current flows in opposite directions through said two paths, a current source for producing one or more current pulses that have sufficient magnitude and sufficiently rapid rise time to produce about the second current path a magnetic field which interacts with a same current pulse then flowing in the first path to exert on one of said portions a pulse of magnetic pressure sufficient to weld one of said portions to the other of said portions, means for coupling said current source to the means providing said connection to the first region of said portions and to the other end of said second current path, and means for opposing movement of said other portion away from said one portion comprising a substantially non-deformable, electrically conductive member in contact with at least one of said portions at said two regions thereby comprising at least a portion of the two means for establishing conductive electrical connection to said two regions of said portions and disposed relative to said other portion so that the pulse of magnetic pressure exerted on said one portion forces said portions against said non-deformable member.

* * * * *